UNITED STATES PATENT OFFICE.

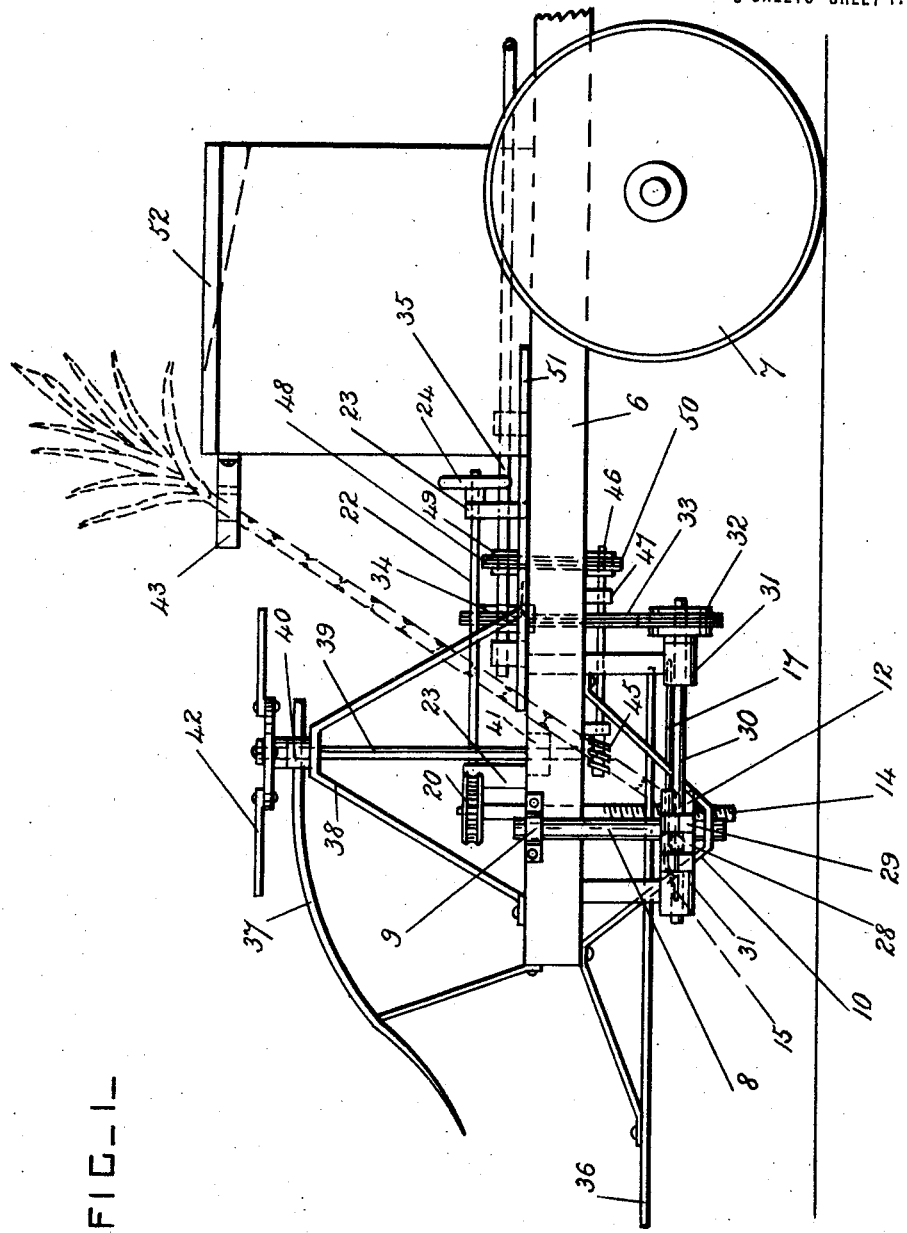

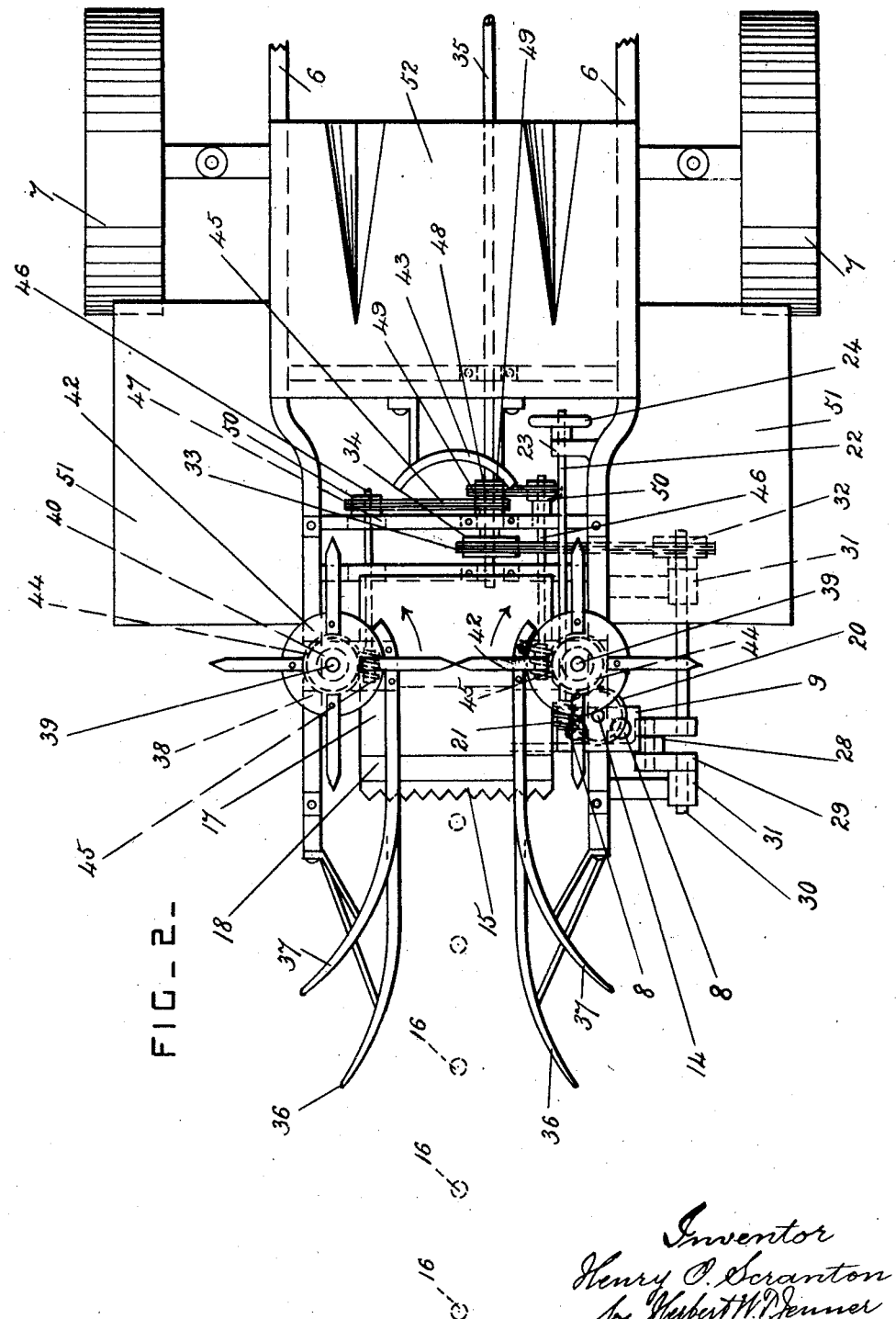

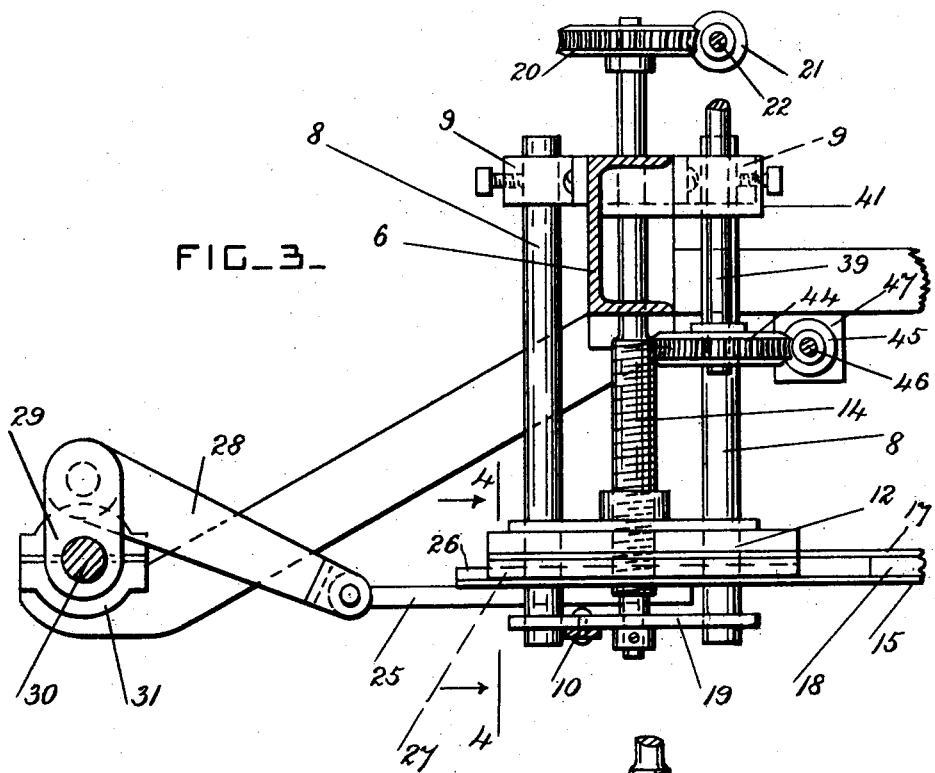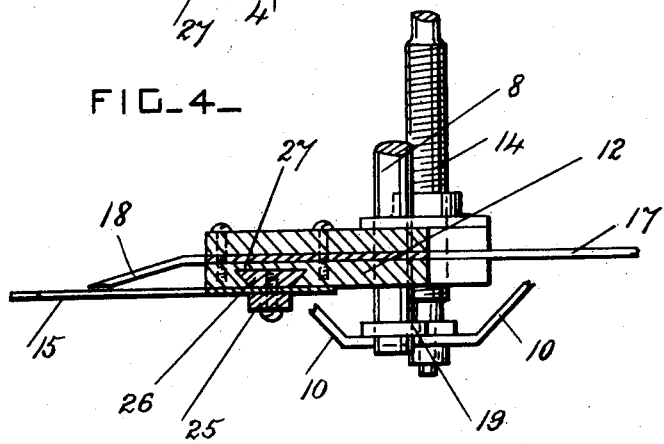

HENRY O. SCRANTON, OF JEANERETTE, LOUISIANA.

CANE HARVESTER.

1,406,093.     Specification of Letters Patent.     Patented Feb. 7, 1922.

Application filed August 11, 1920. Serial No. 402,855.

*To all whom it may concern:*

Be it known, that I, HENRY O. SCRANTON, a citizen of the United States, residing at Jeanerette, in the parish of Iberia and State of Louisiana, have invented certain new and useful Improvements in Cane Harvesters, of which the following is a specification.

This invention relates to machines for cutting down and handling sugar canes, but which may be used for other similar crops; and it consists in the novel construction and combination of the parts hereinafter fully described and claimed.

In the drawings, Figure 1 is a side view of the front end portion of a cane harvester constructed according to this invention. Fig. 2 is a plan view of the same. Fig. 3 is a rear end view of portions of the cutting mechanism, drawn to a larger scale. Fig. 4 is a cross-section taken on the line 4—4 in Fig 3. Various parts are omitted in each figure, for clearness.

The machine is mounted on a truck 6 of any approved construction, and preferably a truck provided with self-propelling mechanism. The front ground wheels 7 are the steering wheels, and are operated from the rear portion of the truck where the motor and driving mechanism are located. Two vertical guide bars 8 are preferably arranged parallel to each other at the front part of the truck, and are secured to one side portion of the truck frame by brackets 9 and braces 10.

A crosshead 12 is arranged to slide vertically on the guide bars 8, and its position is adjusted by means of a screw 14 which engages with a hole in its middle part between the guide bars. A cutter blade or saw 15 is supported by the crosshead and is secured to a cutter bar 25, and projects across the center line of draft of the machine, so that it may engage with the sugar canes, which are indicated by the circles 16 in Fig. 2.

A plate 17 is secured to the crosshead above the saw, and is arranged to the rear of its cutting edge, and operates to support the lower ends of the cut canes. This plate has a downwardly inclined front end portion 18. The cutting blade is preferably serrated or provided with saw teeth, to enable it to cut the canes with facility. The screw 14 is journaled in a bracket 19 secured to the truck frame, and is operated by any approved means. A worm wheel 20 is secured to the upper end of the screw, in the example shown, and is driven by a worm 21, secured on a worm shaft 22, journaled in bearings 23 on the truck, and provided with a hand-wheel 24.

The saw is supported in the crosshead by a dovetailed bar 26 which is secured to the saw over the cutter bar 25, and which slides in a dovetailed guide slot 27 formed in the underside of the crosshead. The saw is reciprocated rapidly, as the machine is moved along, by means of a connecting-rod 28 and a crank 29. The crank is formed on a crankshaft 30, journaled in bearings 31 secured to the truck frame, and provided with a sprocket wheel 32. The sprocket wheel 32 is driven by a drive chain 33 from a sprocket wheel 34 secured on a driving shaft 35 which is operatively connected with the motor.

Lower guide bars 36 and upper guide bars 37 are supported from the truck, and are arranged to project forwardly of it and to straddle the canes in front of the saw. The rear end portions of these guide bars are substantially parallel to each other, and their front end portions project outwardly. The front end portions of the upper guide bars 37 also project downwardly.

The saw is adjusted to cut the canes close above the ground, and the ground wheels run in two furrows, the canes being arranged to grow in a row on a mound between the furrows. The upper guide bars 37 are secured to brackets 38 secured to the truck frame, and vertical spider shafts 39 are journaled in bearings 40 on these brackets, and in bearings 41 on the truck frame. Spider wheels 42 are secured to the upper end portions of the spider shafts, and their arms engage with the canes as soon as they are cut off, and tilt them rearwardly against a cane rest or rack 43 as shown in Fig. 1. The lower ends of the canes slide up the inclined part 18 onto the plate 17.

The spider wheels are revolved in opposite directions by any approved driving mechanism, and in the example shown worm wheels 44 are secured on the lower end portions of the spider shafts. Worms 45 engage with the worm wheels, and are secured on countershafts 46 journaled in bearings 47 on the truck frame. The countershafts 46 are driven from the driving shaft 35 by means of drive chains 48 which pass over sprocket wheels 49 secured on the driving shaft and sprocket wheels 50 secured on the countershafts.

Platforms 51 for two operators are preferably arranged one on each side of the truck frame, and a table 52 is secured to the truck between the platforms. The cane rest or rack 43 is secured to the upper part of this table, and it is curved or otherwise shaped so as to guide the upper end portion of each cane towards the center line of draft of the machine midway between the two platforms.

The table is provided with topping mechanisms for cutting off the tops of the canes, and the operators grasp the canes which rest against the rack 43 one after another and feed them to the two topping mechanisms. These topping mechanisms are preferably those shown in the patent issued to me on June 15, 1920, No. 1,343,589.

What I claim is:

1. In a harvester, a truck, a saw guide supported by the truck, a reciprocating saw slidable in the said guide and projecting crosswise of the center line of draft, guides for the standing plants projecting from the truck on each side of the center line of draft, a stationary support for the lower ends of the cut plants arranged adjacent to the saw, and a rest for the upper end portions of the cut plants supported by the truck and arranged on the center line of draft above and to the rear of the said saw.

2. In a harvester, a truck, two vertical guide bars secured to one side portion of the truck and arranged side by side laterally, a vertically adjustable crosshead mounted on the said guide bars and having a saw guide arranged in front and crosswise of the said guide bars, and a reciprocating saw guided by the said guide and projecting crosswise of the center line of draft of the truck.

3. In a harvester, a truck, two vertical guide bars secured to one side portion of the truck and arranged side by side laterally, a vertically adjustable crosshead mounted on the said guide bars and having a dovetailed saw guide in its underside arranged in front and crosswise of the said guide bars, and a reciprocating saw having a dovetailed bar secured to its upper part and slidable in the said saw guide, said saw being arranged to project crosswise of the center line of draft of the truck.

4. In a harvester, a truck, two vertical guide bars secured to one and the same side portion of the truck, a crosshead slidable on the said guide bars, a screw for adjusting the crosshead engaging with its middle part between the said guide bars, and a longitudinally slidable cutting blade carried by the said crosshead and projecting crosswise of the truck.

In testimony whereof I have affixed my signature.

HENRY O. SCRANTON.